Oct. 21, 1941.  A. ALFORD  2,259,510

COUPLING ARRANGEMENT FOR HIGH FREQUENCY TRANSMISSION SYSTEMS

Filed Aug. 2, 1938  3 Sheets-Sheet 1

INVENTOR
ANDREW ALFORD
BY
ATTORNEY

Oct. 21, 1941.  A. ALFORD  2,259,510
COUPLING ARRANGEMENT FOR HIGH FREQUENCY TRANSMISSION SYSTEMS
Filed Aug. 2, 1938  3 Sheets-Sheet 2

INVENTOR
ANDREW ALFORD
BY
ATTORNEY

Oct. 21, 1941.         A. ALFORD         2,259,510
COUPLING ARRANGEMENT FOR HIGH FREQUENCY TRANSMISSION SYSTEMS
Filed Aug. 2, 1938    3 Sheets-Sheet 3

INVENTOR
ANDREW ALFORD
BY R.C. Hopgood
ATTORNEY

Patented Oct. 21, 1941

2,259,510

UNITED STATES PATENT OFFICE 2,259,510

COUPLING ARRANGEMENT FOR HIGH FREQUENCY TRANSMISSION SYSTEMS

Andrew Alford, San Mateo, Calif., assignor to Mackay Radio & Telegraph Company, New York, N. Y., a corporation of Delaware Application August 2, 1938, Serial No. 222,632

12 Claims. (Cl. 178—44)

My invention relates to transmission modifying networks used in conjunction with a high frequency source and a load for a passive circuit for altering the magnitude and/or phase of the transmission and/or reflection of high frequency waves traveling between the source and the load, and is a continuation in part of my application Ser. No. 162,853, filed September 8, 1937 which issued as U. S. Patent 2,159,648 May 23, 1939. More particularly my invention relates to means for modifying the characteristics of a coupled transmission network so as to readily adjust it for operating conditions.

In the parent application it is pointed out that a network placed in the electromagnetic field and in proximity to the conductors of a transmission line and coupled by a combination of capacitive and electromagnetic induction, will modify the transmission of waves along the transmission line.

In order for this wave modifying effect to be properly controlled, it is necessary to tune the network and to locate it at a particular point along the transmission line to produce the desired reaction on the line. When the network is properly placed and designed, it may operate variously as an impedance matching transformer, a phase shifter, a filter or other wave modifying device.

Such a network may comprise simply a section of transmission line spaced a short distance from the main transmission line and tuned to the particular wavelength at which it is to be effective. The only other necessary properties are that the network be coupled to the transmission line differently at one end than at the other, for example, by spacing one end differently with respect to the transmission line, or by providing a short circuiting bar at one end of the network, and that it be located at a point along the transmission line determined by the effect desired and/or the standing wave distribution that may exist on the line. The network then serves to influence the transmission along the line by virtue of the disturbance it induces in the line, in accordance with the distribution of the waves in the network.

It was pointed out in the parent application that the characteristics of the coupled network may be changed by adjusting the tuning of the network by varying the length of the conductors of the network, for example, by moving the position of a short circuiting bar.

It is one object of the present invention to provide means for easily adjusting the tuning of a coupled network. It is a further object of my invention to provide easily adjustable means for controlling the distribution of waves in a coupled network and accordingly to vary its effect upon a transmission line.

It is a still further object of my invention to provide a coupled section with easily adjustable tuning means for producing the necessary fine adjustment of the network readily after it has been installed.

The above mentioned and other objects and advantages of my invention will be more fully explained in the following description taken in conjunction with the accompanying illustrative drawings in which Figs. 1 and 1A are diagrams used to illustrate the principles of the coupled section;

Figure 12:
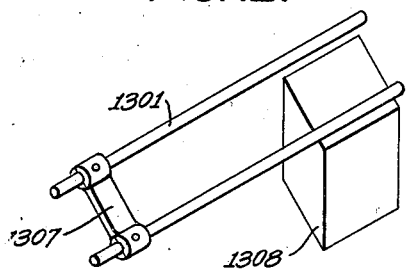
Figure 14:
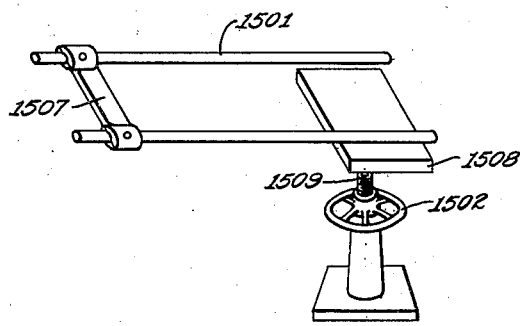
Figure 13:
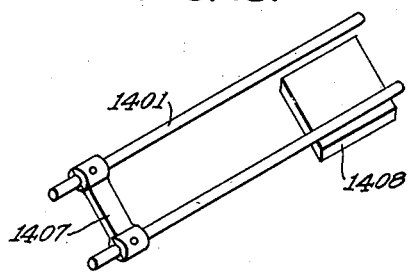
Figure 15:
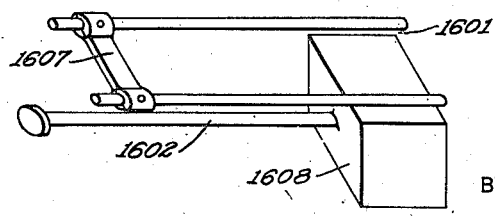

Figs. 12 and 13 illustrate another means for adjusting the coupled network in accordance with my invention, and Figs. 14 and 15 illustrate diagrammatically means that may be used for adjusting the arrangements such as those illustrated in Figs. 13 and 14.

Figure 1:
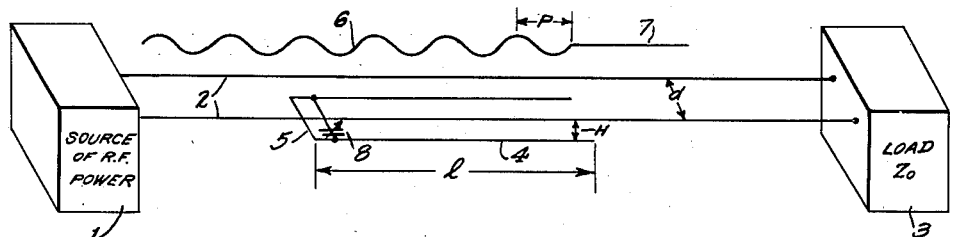

An illustration of the operation of the coupled network in accordance with the parent application is now made in connection with Fig. 1. In this figure, 2 are the conductors of a balanced transmission line, I is a source of high frequency power of wavelength λ, 3 is a load, the impedance of which is equal to the surge impedance of the transmission line 2—2 and 4 is a coupled network. The coupled network 4 is substantially a section of transmission line of the same general construction as the main line 2—2. This section of the transmission line 4 is short circuited at one end by short circuiting wire 5 and is open circuited at the other end. The section line 4 is in a plane parallel to the plane through conductor 2—2, and is directly below said conductors at a distance H. The wavy line 6 and the straight line continuation 7 diagrammatically show the distribution of current along the main line 2—2 which results when the length $l$ of the coupled section 4 is in the neighborhood of one-quarter of wavelength $\lambda$.

The value of the transfer coefficient S for such a section with reference to the loop current $i_o$, that is, with reference to the current in the short wire 5 is given by $$S = \frac{60}{Z_0} \log_e \frac{\sqrt{H^2 + d^2}}{d}$$

The transfer coefficient S is used to express the transfer relationship between the network and the conducting transmission line. It can thus be seen that the network 4 may be used to introduce standing waves in the transmission line which may have a considerable variation in the ratio of the standing wave maximum to minimum value, designated by $q$.

Figure 1A:
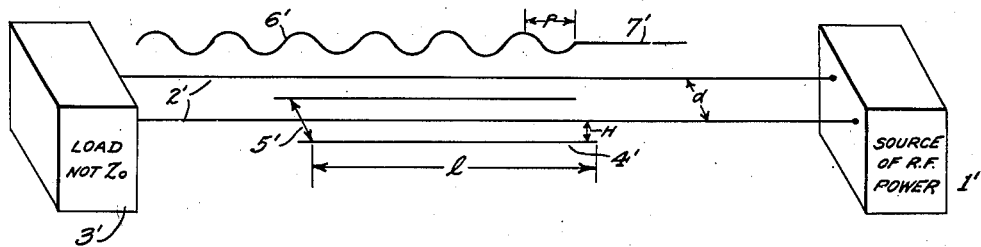

The fact that a coupled network can produce a wide range of value $q$ in a transmission line in the arrangement of Fig. 1, has an immediate practical application to matching of the impedance of a load to the surge impedance of a transmission line as well as to other practical uses. These applications are based on the following theorem which is referred to as the reciprocity law for standing waves. This law holds for networks in which the dissipation is negligible. The proof of this theorem is quite lengthy and is omitted but the result is stated in connection with Figs. 1 and 1A. Fig. 1A shows an arrangement which is similar to the arrangement of Fig. 1 except that in Fig. 1A the standing waves diagrammatically illustrated by wavy line 6' are produced not by the coupled network but by the load 3', the impedance of which is not equal to the surge impedance of the transmission line. The straight continuation 7' of the wavy line 6' shows that there are not standing waves along the portion of the transmission line between the source of high frequency power 1' and the coupled section. In this arrangement of Fig. 1A, the coupled network acts as an impedance matching device which eliminates standing waves caused by a mismatch at the load end of the transmission line. This action of the coupled network in the arrangement of Fig. 1A is an exact counterpart of the action of the same network in Fig. 1 in which the transmission line was matched at its load end and the standing waves were produced by the network.

The relation between the two arrangements shown in Figs. 1 and 1A may be called the reciprocity law for standing waves which may be stated as follows:

If a non-dissipative network, which in arrangement of Fig. 1 produces standing waves of ratio $q$ and a position parameter P is coupled to a line in which there exists standing waves of the same ratio $q$, as in Fig. 1A, and is positioned at such a place that the distance between the network and one of the current maxima is equal to P, then the network produces a reflectionless line.

When a network is assymetric in some respects, for example as in Figs. 1 and 1A, so that its oscillator end in arrangement of Fig. 1 differs from its end near $Z_0$, the theorem still holds, provided that in transferring the network into the arrangement shown in Fig. 1A, the network is reversed so that its oscillator end in Fig. 1 points to the load in Fig. 1A.

From this it is clear that an arrangement may be provided which will positively provide a complete impedance match of the transmission line at a particular frequency. It is, however, necessary in order that the frequency match be properly made that the networks, 4 and 4', be electrically substantially ¼ of a wavelength long. Because of insulator losses and other effects, it is found that in general the length must differ somewhat from a physical quarter wavelength. This adjustment may be made by actually physically cutting the wires into shorter lengths. However, it is difficult by this process to provide a precise adjustment. In order to facilitate the adjustment of such a coupled section arrangement, it is desirable to provide some form of a trimming arrangement for adjusting the tuning. In Fig. 1, I have shown one way this may be accomplished by use of the variable condenser 8.

The condenser may be arranged at any point along the coupled section but since the voltage at the open end of the section is generally quite high, it is desirable that the condenser be placed near the short circuited low voltage end of the network. In fact, due to the high voltage, a conductor placed across the open end of the section would be so small that it would be quite difficult to precisely adjust it. Furthermore, in approaching the high voltage end of the network a considerable disturbance of the tuning would be introduced. It is, therefore, desirable in using such a trimming arrangement to provide the condenser at a point adjacent the short circuiting bar.

In place of a condenser a variable inductance may be used. However, it is generally preferable to use a condenser since it presents less loss at high frequencies. Other means may be used also to adjust the tuning, such as those illustrated in Figs. 13 and 14. Moreover, other means of tuning may be used, such as adjusting the separation of the conductors at one end of the network. This method is satisfactory provided only small adjustments are required.

It should be understood that in every embodiment shown any of the various forms and arrangements may be used for providing the necessary adjustment of the networks.

In Fig. 1A, I have shown diagrammatically a means for adjusting the tuning by providing that the short circuiting bar itself may be adjustable for varying the length of the arrangement.

Figure 2:
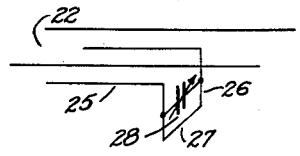
Figs. 2, 3 and 4 illustrate a few of the other forms which the network may take.
Figure 3:
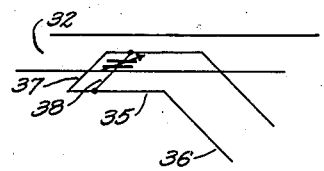
Figure 4:
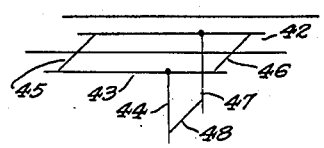

Although in Figs. 1 and 1A, the network is shown as comprising a pair of conductor systems, this network may comprise a plurality of forms. A few of these various forms are shown in Figs. 2, 3 and 4. In Fig. 2 is shown a coupled network coupled to a transmission line 22. In this arrangement a portion 25 of the network extends parallel to the transmission line and a portion 26 is provided perpendicularly thereto. The short circuiting bar 27 is provided across the depending portion 26. A tuning condenser 28 is illustrated connected across the networks adjacent the short circuited end thereof. In Fig. 3 is illustrated a form of network connected to transmission line 2. In this arrangement the short circuiting bar 37 is provided across the end of the conductors which extend parallel to the transmission line and condenser 38 is bridged across the member adjacent this point. The extending arms 36 are provided which extend downwardly at an angle from the portion 35.

In Fig. 4 there is shown still another form of coupled network. In this figure the transmission line 42 has coupled to it a network 44 which comprises conductors 43, arranged parallel to the transmission line and provided with short circuiting bars 45, 46. At a point intermediate 45, 46 is connected a depending portion 47 which is provided with a short-circuiting bar 48. The conductors 43 and the conductors of depending portion 47 may be extended indefinitely since the currents in the network do not penetrate beyond the shorts except to a very small extent. In extending the conductors beyond the shorts caution is to be exercised in order to avoid the extended conductors together with one of the shorts from becoming another coupled network of low reactance in which considerable current may be present and which produce an undesirable reaction on the line. In order to avoid such a phenomenon the wires extended beyond the coupled network proper may be shorted every quarter or every three-eighths of the wavelength. This procedure insures that the incidental coupled networks acquire such high reactances that no appreciable current can circulate in them so that they can produce no substantial effect on the waves in the transmission line. The dimensions of the network 44 should be such that the reactance of the network, measured for example at a point along short-circuiting bar 45 where the latter is imagined to be cut in two for that purpose, should be fairly low in order that currents may be induced. The reactance of the network 44 may be adjusted to any desired value including zero by moving the shorts 45, 46 and 47. This network has the advantage in that it may be installed without the use of any insulators and has another advantage in that by shifting the shorts 45, 46 and section 47 along the wires 43 of the network the whole network may be shifted. This sometimes simplifies both construction and adjustments because wires 43 may be stretched out tight between supports once and for all and the shorts 45, 46 and section 47 added later.

Figure 5:
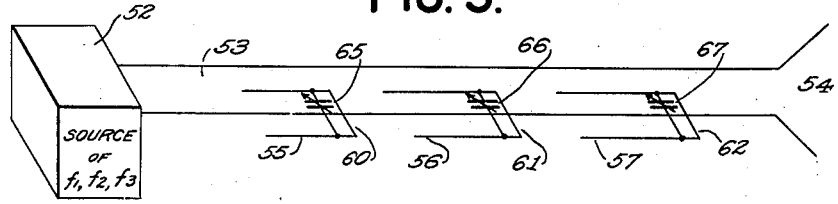
Fig. 5 illustrates an application of the network for matching a transmission line at a plurality of frequencies.

The impedance matching arrangement of Fig. 1A may be utilized to match a transmission line at a plurality of different frequencies. Such an arrangement is illustrated in Fig. 5. In Fig. 5, 52 is a high frequency source producing three different high frequencies $f_1$, $f_2$ and $f_3$ connected over a transmission line 53 to a load 54 which may be a transmitting antenna. Coupled to this line are three networks 55, 56 and 57, these networks being adjusted to match the line separately at frequencies $f_1$, $f_2$ and $f_3$. Each of the networks 55, 56 and 57 is provided with suitable adjusting means, such as condensers 65, 66 and 67, respectively. These trimming condensers may be used to precisely adjust the networks so as to match the line as desired. It should be understood that any other form of trimming means may be used, such as means for adjusting the length of the network conductors, or other means to be later described. With this arrangement the three frequencies may be simultaneously or alternatively transmitted to antenna 54 without change in the circuit. The system may be constructed by applying these frequencies to the line one at a time and designing and erecting the respective networks to match the line at that frequency, in accordance with the principles already explained in detail in connection with Fig. 1A. For example, $f_1$ may be introduced into the line and element 55 adjusted as though $f_1$ was the only frequency to be transmitted. Subsequently frequencies $f_2$ and $f_3$ may be separately applied to the line and the networks 56, 57, respectively, similarly adjusted to match the line at these two frequencies. Should it become desirable to use the line for still other frequencies, additional network units may be added.

Figure 6:
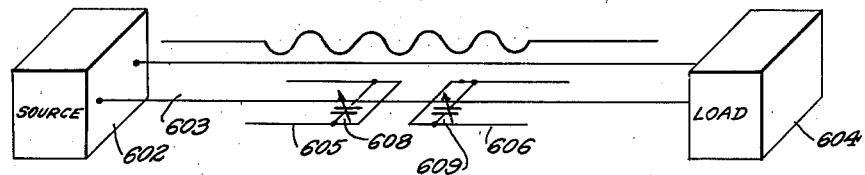
Fig. 6 illustrates an example of coupled networks in conjugate relationship.

In Fig. 6 an application of coupled networks for the purpose of phase changing is illustrated. In this figure 602 represents a source of high frequency energy coupled to a line 603 and to a load 604. If for some reason it is desirable that the phase of the energy introduced into 604 be adjusted, as for example, if waves of two different frequencies are to be delivered thereto and one of the waves delayed or advanced in phase this adjustment of phase may be made by using two networks coupled to the line. Accordingly I have shown two networks 605, 606 coupled to the line similarly to the other showings in the drawings and are adjusted by means of suitable devices such as condenser 608, 609. Network 605 may be adjusted so as to introduce reflections producing standing waves on line 602, and 606 may then be adjusted and positioned so as to match the line and remove the standing waves. By proper adjustment of the networks the phase of the waves may be regulated so as to produce any desired phase delay or advance at load 604. Thus it is made possible to produce a phase delay or advance of waves of one frequency without affecting the phase of waves of another frequency transmitted over the same line.

Figure 8:
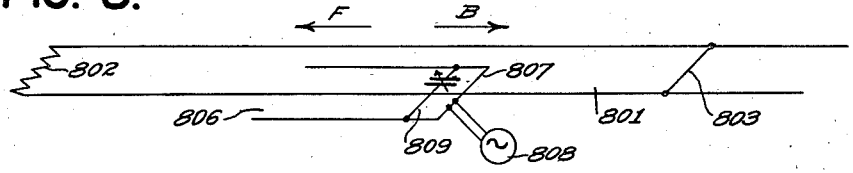
Figs. 8 and 9 illustrate another use of the coupled network in accordance with my invention connected to a line to operate as selective filters.

In Fig. 8 is illustrated another use of the network which is outlined above. In this figure to the transmission line 801 there is coupled a network 806. Across the network near the short-circuiting bar 807 is connected a source of high frequency energy 808. The point at which the source 809 is connected may be so adjusted that the impedance looking into the network at this point matches the impedance of the source of the surge impedance of a transmission line which is used to connect the source so that an efficient transfer of energy is obtained. Such condition requires proper adjustment of the length of the coupled section, or other tuning means as for example condenser 809, as well as the position of the points at which the source is connected. In practice these adjustments may be made by process of successive approximations which may be greatly simplified by first adjusting the tuning of the section so that the impedance seen by the source is substantially resistive and sliding the points of connection so that this impedance is either decreased or increased to the proper value. The transmission line is terminated into load 802 the impedance of which is equal to surge impedance $Z_0$ of the line. When the network is placed in proximity to the line, forward and back waves will be introduced therein as indicated by the arrows. Since the transmission line is terminated in its surge impedance at 802 the forward wave travelling thereto will not be reflected. In the other direction, however, a short-circuiting bar 803 is provided across the transmission line. Consequently the back wave B will be reflected at this point back toward the termination 802. By adjusting the short-circuiting bar 803 this reflected wave may be brought into any desired phase with the forward wave. Thus, for example, these two waves may be brought in phase with each other and the overall transfer coefficient between the line and the network increased or they may be made to oppose each other and the transfer coefficient decreased. When the coupled network is of such form that its forward and backward transfer coefficient $S_1$ and $S_2$ are equal as, for example, is the case when the network has the form shown in Fig. 8, the opposition of the two waves results in mutual cancellation so that the overall transfer coefficient in this case is substantially zero and consequently very large currents in the network produce substantially no current in the load. At all other positions of the shorting bar the transfer coefficient is not zero and may be made to have a desired value by adjusting the spacing between the network and the line. Adjustment of the section is facilitated by using the trimmer condenser, or other easily adjusted trimming arrangement.

Figure 9:
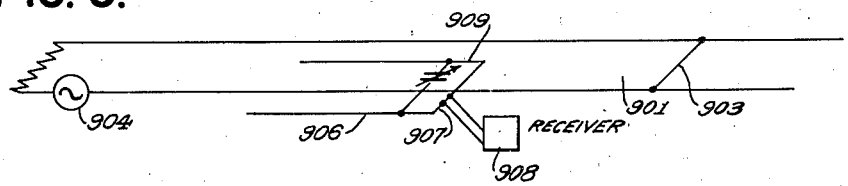

The system outlined above may likewise be applied to reception in accordance with the general reciprocity law. Accordingly a system such as shown in Fig. 9 may be used. In this figure 901 represents the transmission line and 906 the coupled section. However, in place of the source of high frequency energy coupled to the short circuiting bar 907, a receiver 908 is coupled thereto. At some portion of the transmission line near the forward end is introduced a high frequency from a source 904. The short-circuiting bar 903, condenser 909 or other suitable means may be used to adjust the coupling in accordance with the principles outlined above. Since efficient transfer of energy from the coupled network into the receiver will take place only at one frequency for which proper adjustments described above were made it is clear that this arrangement will tend to act inefficiently at all freqeuncies with the exception of the one for which it is adjusted and some of its harmonics.

Figure 7:
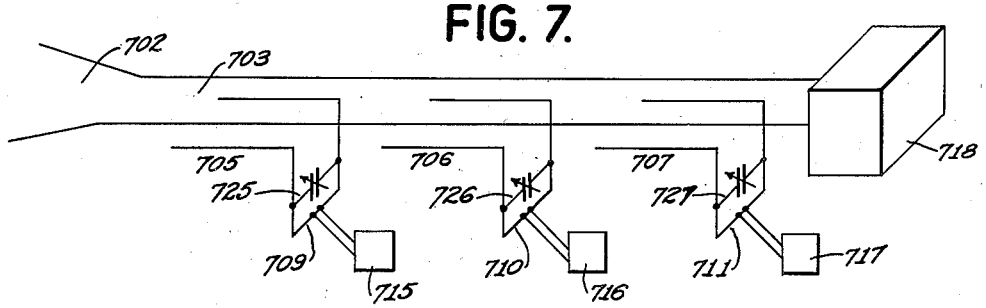
Fig. 7 illustrates coupled networks used as selective filters.

The arrangement of Fig. 8 is also useful when it is employed as shown in Fig. 7 in connection with one or more similar arrangements each operating at a different frequency. In this figure 702 represents an antenna tuned so as to receive or transmit a number of different radio frequencies. Connected to antenna 702 is a transmission line 703 terminated at its distant end by some load 718 which may be a receiver, or transmitter, or some impedance, for example, a short-circuiting bar. At various points along the line are coupled networks 705, 706 and 707, respectively. Network 705 is so adjusted by condenser 725 and the receiver 715 is connected across the wires of the network at such points as to effect transfer of energy at the received frequency. Under these conditions only the frequency and source of its harmonics desired will be received on receivers 715. This may be clearly understood when it is considered that a network such as 705 will be coupled to the line at substantially only the frequency to which it is adjusted and will, in effect, be substantially fully uncoupled for the other frequencies. The units 706, 707 are similarly adjusted with respect to distance from the remote point of line 703 and for reception of the respective frequencies to which it is desired that they be effective for reception. Thus receivers 716, 717 are coupled across shorting bars 710, 711 similarly to the coupling 715 across 709. If it is desired to receive other frequencies which the antenna 702 is capable of receiving, it is merely necessary to couple other networks to transmission line 703 at the proper point, adjust these networks for the desired frequency, and connect to them a receiving apparatus. The same arrangement may be employed when it is desired to connect to the same load several source of high frequency power. In this case the arrangement of Fig. 7 may be used substantially as just described with the only exception that the receivers shown in this figure are to be replaced by transmitters.

The arrangement of Fig. 7 may also be employed for the purpose of transmitting and receiving on the same antenna. In this case 718 may be a transmitter and operating at some frequency $f_4$, while 715, 716, 717 are receivers receiving frequencies $f_1$, $f_2$, $f_3$, different from $f_4$.

Figure 10:
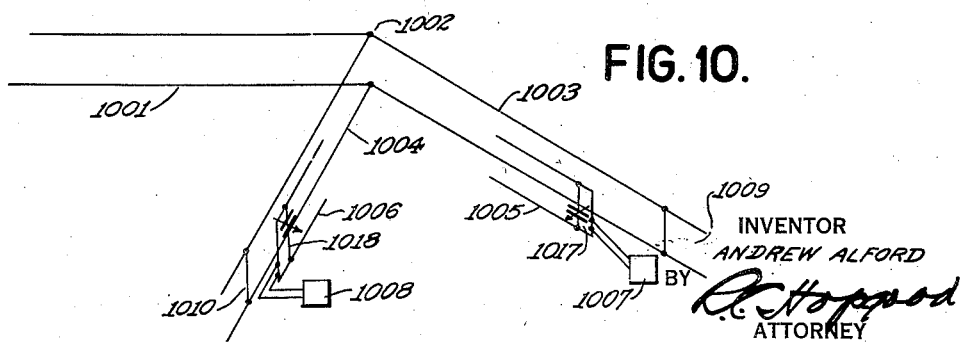
Fig. 10 illustrates two networks such as shown in Figs. 8 and 9 coupled to a transmission line.

In Fig. 10 I have shown one special application of the principle as disclosed in Figs. 8 and 9. In this figure 1001 represents a transmission line upon which are waves of two frequencies $f_1$ and $f_2$. This transmission line is branched at point 1002 into two lines 1003 and 1004. Coupled to line 1003 is a network 1005 and to this network is connected a receiver 1007, the transmission line branch 1003 is terminated by a short-circuiting bar 1009. Network 1005 and the short-circuiting bar 1009 may be adjusted by means of condenser 1017 as described above in connection with Fig. 9 to receive waves of one frequency, for example, frequency $f_1$. In transmission line branch 1004 is provided a short-circuiting bar 1010 similar to 1009 and coupled to this line is a network 1006 to which is connected a receiver 1008. The network 1006 is tuned by condenser 1018 to frequency $f_2$ and is adjusted with respect to short-circuiting bar 1010 so as to receive waves of frequency $f_2$. The same arrangement shown in Fig. 10 may be employed for connecting two transmitters to the same antenna. This may be accomplished by using transmitters instead of receivers at 1007, 1008.

In selecting length of branch lines 1003, 1004 care must be exercised to avoid such lengths as will result in one of these branch lines effectively short-circuiting the other. For example, if the length of line 1004 from 1002 to 1010 is made equal to a half wavelength of the frequency received or transmitted by 1007 the arrangement will not function satisfactorily. In order to avoid such a condition and insure the least amount of interference between the two branch lines each line may be made, for example, an odd number of quarter waves long at the frequency for which the other branch is designed.

It is clear that while I have shown only a few applications of the network that the other specific applications and uses may be made thereof. However, the uses of the network are claimed in my copending application, Serial No. 162,853, and for this reason more specific mention of them is not made at this time.

Figure 11:
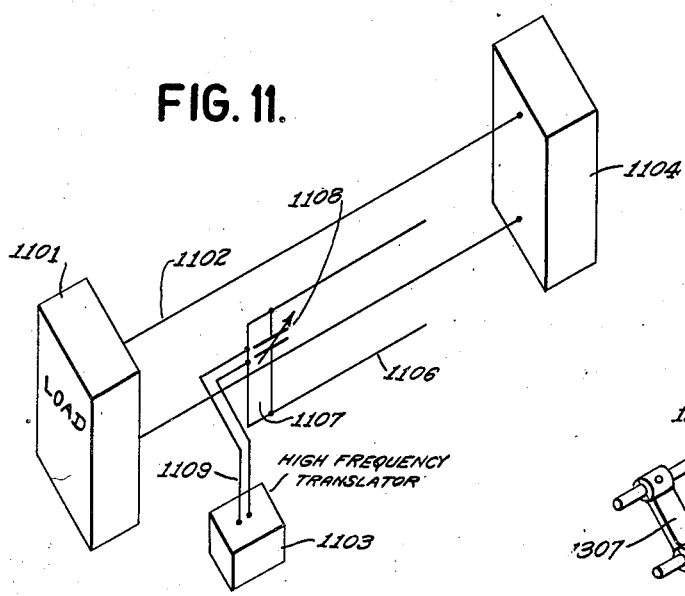
Fig. 11 illustrates another arrangement of a network coupled to a high frequency translating apparatus.

In Fig. 11 is shown another application of the network to the use as a coupling arrangement similar to that illustrated in Figs. 7 and 9. In this arrangement I have provided a load 1101 which may be a short-circuiting bar or a surge impedance coupled by a transmission line 1102 to a high frequency arrangement which may constitute, for example, a receiving or transmitting antenna. The transmission line in this figure is arranged with the conductors vertically one above the other. A coupled network 1106 is provided spaced a horizontal distance away from transmission line 1102. To this network across short-circuiting bar 1107 is connected the lead-in conductor 1109 coupled to a high frequency translator 1103 which may, for example, be a high frequency transmitter or receiver. Across the network 1106 at a point adjacent the short-circuiting bar is provided a variable tuning condenser 1108. By use of this condenser the tuning of the network may be facilitated and an adjustment of the coupling between the translating apparatus and the transmission line greatly facilitated.

While I have described above arrangements in which the trimming adjustment of the coupled network is produced either by adjusting the length of the conductor or by adjusting a variable condenser, other forms and means for producing desired trimming adjustment may be utilized. In Fig. 12 one such arrangement is disclosed. In this arrangement the network alone is illustrated without the transmission line to which it is to be coupled. The network 1301 is shown in the form similar to that of other figures of the drawing. At a point spaced from the short-circuiting bar 1307 and preferably near the open ends of the network is provided a block of insulation 1303. This insulating material may, for example, be a cube of pyrex glass or any other suitable dielectric. With the high frequencies used in the transmission system the presence of such a mass of dielectric in the proximity of the coupled network causes a disturbance in the network and therefore varies its coupling with respect to the transmission line. An adjustment may be provided by moving the dielectric block toward or away from the section. It is preferable that during such movement the block be maintained at a point symmetrical with respect to the network in order that the balance may not be disturbed.

In Fig. 13 I have illustrated still another arrangement which may be used for adjusting the trimming of the network in accordance with my invention. In this figure the network is designated as 1401 and is provided with a short-circuiting bar 1407. At a point preferably near the open end of the network is provided a metallic conducting plate 1408. By moving this plate with respect to the network an adjustment in the operating characteristics of the network may be obtained. Thus this metallic plate serves to produce a trimming adjustment of the network.

In Fig. 14 I have illustrated one mechanical arrangement which may be used for positioning the dielectric block 1303 or the conductive plate 1408 illustrated in Figs. 13 and 14. In this figure the section illustrated at 1501 is provided with a short-circuiting arrangement 1507. At a point adjacent the end of the section is provided a distribution disturbing device 1508 which may be either a metallic plate or a dielectric block. This block is mounted upon an adjustable spindle 1509 and a hand wheel 1502 is provided for raising or lowering the block with respect to the network.

In Fig. 15 I have illustrated still another arrangement that may be used for adjusting a wave modifying block with respect to a coupled network section. In this figure the network 1601 provided with a short-circuiting bar 1607, is mounted suitably and adjacent thereto is provided a wave modifying member 1608 which may be a dielectric block or a metallic plate as described in connection with Figs. 13 and 14. This element 1608 may be mounted on some smooth surface so as to be easily slidable, and a rod 1602 is provided for advancing this block toward the section or switching it away therefrom. By using the rod 1602 it is readily possible to adjust the block with respect to the network without the necessity of coming into close proximity with the high voltage end of the network. Thus an operator may stand near the short-circuited low voltage bar 1607 and effect the desired adjustment of the position of the block.

It is considered self-evident that other suitable mechanical means may be readily provided for effecting the desired adjustment of the various elements.

Moreover, it is clear that means such as screw threaded arrangements may be readily provided for adjusting the short-circuiting bar of a coupled network so as to readily change the length by such an adjustment.

It is likewise clear that suitable means may be provided for telescopically adjusting the open end of the coupled network for the purpose of varying its tuning. Other modes of adjustment of the tuning of such a coupled network are likewise clearly within the realm of the present invention.

Although I have disclosed only a few specific embodiments of the adjusting means for use in accordance with my invention, it should be distinctly understood that these illustrations are not intended to define the scope of my invention. What I consider the scope of my invention and desire to protect is defined in the appended claims.

What I claim is:

1. In a high frequency signalling system, a substantially uniform transmission line connected between a source of high frequency energy and a load for carrying high frequency signals, and means for influencing the transmission of waves along said line comprising a conductor arrangement conductively separated from said line and coupled to said line differently at one end than at the other, said conductive arrangement being short relative to said line, and means for adjusting the tuning of said conductor.

2. In a high frequency signalling system, a substantially uniform transmission line connected between a source of high frequency energy and a load for carrying high frequency signals, and means for influencing the transmission of waves along said line comprising a conductor arrangement conductively separated from said line and coupled to said line differently at one end than at the other, said conductive arrangement being short relative to said line, and means for adjusting the tuning of said conductor comprising a capacity element cooperating with said conductor.

3. In a high frequency signalling system, a substantially uniform transmission line connected between a source of high frequency energy and a load for carrying high frequency signals, and means for influencing the transmission of waves along said line comprising a conductor arrangement conductively separated from said line and coupled to said line differently at one end than at the other, said conductive arrangement being short relative to said line, and means for adjusting the tuning of said conductor comprising means located adjacent said conductor and out of contact therewith for modifying the distribution of the energy about said conductor.

4. A high frequency signalling system comprising a substantially uniform two conductor transmission line connected between a source of high frequency energy and a load, and means for influencing the transmission of waves along said line comprising a pair of conductors conductively separated from said line and coupled thereto differently at one end than at the other, said conductive arrangement being short relative to said line, and means for adjusting the effective length of said conductors.

5. A high frequency signalling system according to claim 4, in which said pair of conductors are connected together at one end by a directly connected conductor, and said means for adjusting comprises reactive means bridged between said conductors.

6. A high frequency signalling system according to claim 4, in which said pair of conductors are connected together at one end by a directly connected conductor, said means for adjusting comprising a variable condenser connected between said conductors at a point adjacent said directly connected conductor.

7. A high frequency system comprising a substantially uniform high frequency transmission line connected between a source of high frequency energy and a load, high frequency translating apparatus, means for coupling said translating apparatus to said line comprising a conductor network conductively separated from and coupled to said transmission line differently at one end than at the other said conductive arrangement being short relative to said line and spaced from said transmission line, and a connection between said translating apparatus and said network, and adjustable means operatively associated with said network for varying the coupling between said network and said transmission line.

8. A high frequency system comprising a substantially uniform high frequency transmission line connected between a source of high frequency energy and a load, high frequency translating apparatus, means for coupling said translating apparatus to said line comprising a conductor network conductively separated from and coupled to said transmission line differently at one end than at the other said conductive arrangement being short relative to said line and spaced from said transmission line, and a connection between said translating apparatus and said network, and a variable reactance means associated with said network for varying the coupling between said network and said transmission line.

9. A high frequency system comprising a high frequency transmission line, high frequency translating apparatus, means for coupling said translating apparatus to said line comprising a conductor network coupled to said transmission line differently at one end than at the other, and spaced from said transmission line, and a connection between said translating apparatus and said network, and means comprising a block of dielectric material spaced from said network and in the electromagnetic field thereof, and means for adjusting the position of said block relative to said network for varying the coupling of said network with said transmission line.

10. A high frequency system comprising a high frequency transmission line, means for influencing the transmission of waves along said line comprising a conductor spaced from said transmission line and coupled to said line differently at one end than at the other, and means for varying the overall coupling of said conductor with said transmission line comprising means symmetrically positioned with respect to said conductor in the energy field thereof, and means for adjusting the position of said last named means with respect to said conductor.

11. A high frequency system according to claim 10, in which said symmetrically positioned means comprises a conductive plate.

12. A high frequency system according to claim 10, in which said symmetrically positioned means comprises a block of dielectric material.

ANDREW ALFORD.